United States Patent [19]

Anger et al.

[11] Patent Number: 5,101,481
[45] Date of Patent: Mar. 31, 1992

[54] ADAPTER AID FOR THE TROUBLE-FREE CONNECTION OF COMPUTER PERIPHERALS TO A DEVICE INTERFACE CONTROLLED BY COMPUTER SYSTEMS

[75] Inventors: Horst Anger, Neuried; Anton Hopfes, Schamach/Grafing; Rainer Marquart, Geretsried, all of Fed. Rep. of Germany

[73] Assignee: Siemens Aktiengesellschaft, Munich, Fed. Rep. of Germany

[21] Appl. No.: 531,008

[22] Filed: May 31, 1990

[30] Foreign Application Priority Data

May 31, 1989 [EP] European Pat. Off. ........... 89109833

[51] Int. Cl.$^5$ ................. G06F 15/46; G06F 3/00; G06F 13/40
[52] U.S. Cl. ................. 395/325; 364/238.2; 364/240.3; 364/DIG. 1
[58] Field of Search .................. 364/200, 900

[56] References Cited

U.S. PATENT DOCUMENTS

| | | | |
|---|---|---|---|
| 4,254,473 | 3/1981 | Galdun et al. | 364/900 |
| 4,451,886 | 5/1984 | Guest et al. | 364/200 |
| 4,713,793 | 12/1987 | Conforti | 364/900 |
| 4,985,892 | 1/1991 | Camanata | 370/123 |
| 4,988,890 | 1/1991 | Narhi et al. | 307/147 |

OTHER PUBLICATIONS

IBM Technical Disclosure Bulletin, "Dual-Bus Interface for Small Computer System Interface Controllers", vol. 31, No. 4, Sep. 1988, pp. 293-296.

*Primary Examiner*—Michael R. Fleming
*Assistant Examiner*—Robert S. Hauser
*Attorney, Agent, or Firm*—Hill, Van Santen, Steadman & Simpson

[57] ABSTRACT

An adapter aid (ADE) is connected to a device interface (PS) provided for the parallel connection of computer peripherals (PE) to a computer system (RE), and to an additional device interface (PSZ) to which further computer peripherals (RE) can be connected in parallel fashion. In the adapter aid (ADE) the bidirectional and/or unidirectionally effective data and control interface contacts of the two device interfaces (PS, PSZ) are directed via bidirectionally and unidirectionally controllable, switchable and signal regenerating switching means (BST;EPST;LTE;BT). These switching means (BST,DPST,LTE,BT) can only be switched effectively if a computer peripheral (PE) is connected to the additional device interface (PSZ) and currently no information is transmitted via the device interface (PS) by another computer peripheral (PE) or by a computer system (RE). Due to the adapter aid (ADE) the range of the device interface (PS) is increased and a trouble-free connection of computer peripherals (PE) to the device interface (PS) during the operation of the computer system (RE) is possible.

3 Claims, 2 Drawing Sheets

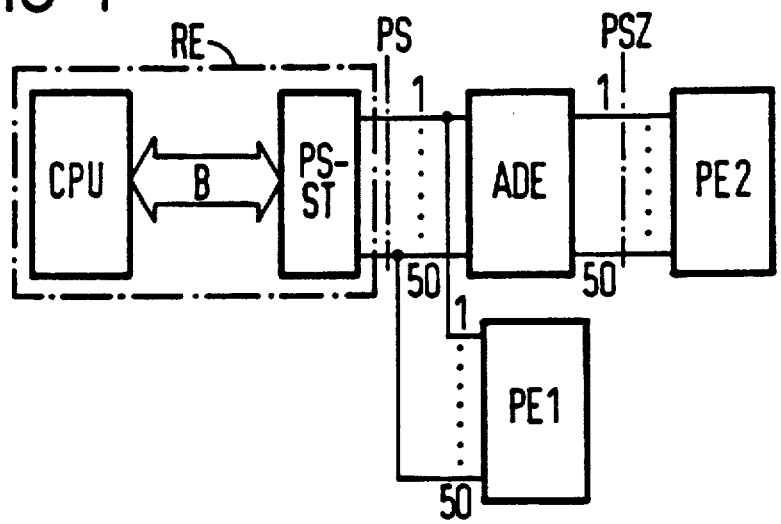
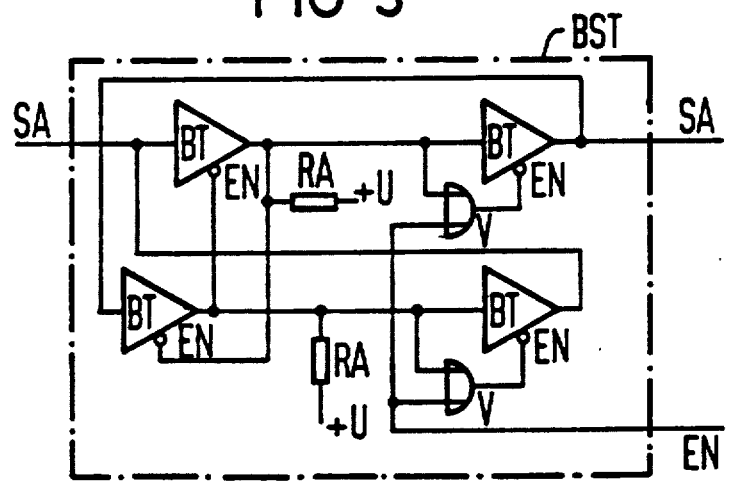
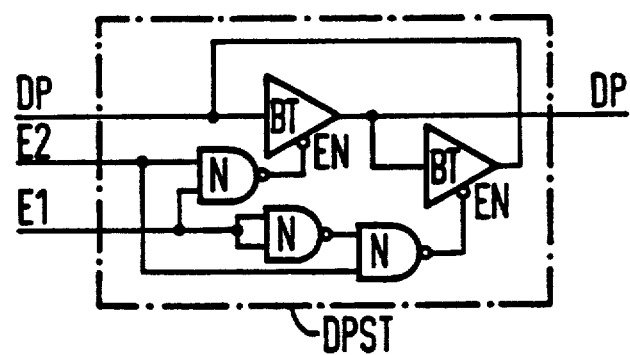

ADAPTER AID FOR THE TROUBLE-FREE CONNECTION OF COMPUTER PERIPHERALS TO A DEVICE INTERFACE CONTROLLED BY COMPUTER SYSTEMS

BACKGROUND OF THE INVENTION

Computer peripherals as for example floppy disk drive mechanisms, fixed memory devices, magnetic disks etc. are usually connected to a computer system or computer systems via a device interface. Most of the time this device interface is controlled by separate interface controls which are connected, via a computer bus system with a central processing unit, generally called CPU of a computer system and in the peripheral installations with the central control thereof. Via initialization of the central processing installation, data can be transmitted from there to the computer peripherals, and e.g. stored there or, data stored there can be forwarded to the central processing apparatus for further processing.

For the connection of the most various peripheral memory and output installations to small computer systems, a standardized device interface has been employed for quite some time; the "Small Computer System Interface", established in the document X3T9.2 of ANSI (American Nationals Standard Institute). To this device interface several computer peripherals can be connected in parallel fashion The standardized device interface has 50 connecting points whereby maximally 25 interface connections, i.e. two connecting points per interface connection, can be realized. For the bidirectional transmission of addresses and data, the device interface is equipped with 8 data interface contacts and with a data parity bit interface contact. For the control of the device interface, a further nine control contacts are provided. These are, respectively:

a bidirectionally controllable "busy" interface contact, where it is indicated either from a computer peripheral or a computer system that the device interface has already been switched active. Such an actively switched device interface must not be commanded regarding data or address transmission by any other computer peripheral or a computer system.

a bidirectionally controllable "Select" interface contact, via which together with the feeding of target adresses at the data interface contacts from a computer system or from a computer peripheral, a target computer system/predictor or a target computer peripheral is selected.

a data/control interface contact acting from the computer peripheral to the computer systems at which the current transmission of data or control information via the data interface contacts is indicated.

an input/output interface contact acting from the computer peripheral to the computer systems, with which the direction of the data transmitted via the data interface contacts is controlled.

a communication interface contact effective from the computer peripheral to the computer systems, at which the current transmission of data via the data interface contacts is indicated.

an "acknowledge" interface contact effective from the computer systems to the computer peripheral, at which the acknowledgement information on the data interface contacts during an inquiry/acknowledge transmission operation is indicated.

a "request" contact effective from the computer peripheral to the computer systems, at which the request information on the data interface contacts during a request/acknowledge-transmission operation is indicated.

an "attention" interface contact effective from the computer systems to the computer peripheral, with the help of which the respective computer peripheral is informed that a data information is ready for a transmission thereto.

a bidirectionally controllable "reset" interface contact, which indicates the reset condition, i.e. a defined operation output condition either to a computer peripheral or to a computer system. An installation is placed in its reset condition after disturbances, failures or given an initial operation, in order to set a defined output operational condition.

The interface contacts of the respective computer peripheral or computer systems which do not participate in an actual communication transmission are controlled in impedance fashion by the interface controls of the respective computer peripheral o the computer systems. By that means, the fault liability at the device interface is decreased and the energy consumption reduced. At the asymmetrical device interface, the computer peripheral or computer systems can be connected via maximally 6 meters long flat cables twisted in pairs.

During the operation of the computer systems no further computer peripheral or computer systems can be connected to the device interface since the capacitance and inductance changes caused by the connection can cause signal disturbances at the device interface and thus data transmission disturbances which can lead to a disturbance or to a shorttime failure of the computer systems.

SUMMARY OF THE INVENTION

The object the present invention is to increase the range (of transmission) of the device interface that is limited by the defined maximal length of the interface cables, and to enable the connection of computer peripherals to the device interface during the operation of the computer systems.

One significant advantage of the invention must be seen in the fact that the employment of the adapter aid according to the invention requires no change of the physical and procedural features of the known device interfaces at the computer systems as well as at the peripheral equipment.

Another advantage of the invention must be seen in the fact that the interface contacts of the device interface of the adapter means that ar switched in parallel fashion respectively with other device interfaces of other computer peripherals, computer systems or adapter means, can only be activated via a control interface contact if, at the additional device interface of the adapter means, a peripheral installation or a computer system is actively connected. If no installation is connected, the terminals/contacts of the device interface of the adapter means are controlled in high-impedance fashion, whereby any disturbance of this device interface is prevented. Advantageously, as control interface contact at the additional device interface, an original ground potential interface contact is provided. If a computer peripheral is connected to the additional device interface, ground potential is led to the control interface contact via the computer peripheral. However, the computer peripheral is actively controlled to the device interface only then when the device interface is not occupied, i.e. if currently no data or address information is transmitted. Due to this measure, it is possible to connect computer peripherals to the device interface even during the operation of the computer systems.

In adoption of the invention, particularly advantageous circuit-related realizations of the interface contacts that can be controlled in high-impedance fashion and of the switching means are specified.

In the following, the invention is explained in more detail with an exemplary embodiment presented in several figures.

DESCRIPTION OF THE DRAWINGS

Reference will now be made to the accompanying drawings, in which:

FIG. 1 is a block diagram of a computer system with connected computer peripherals;

FIG. 3 is a circuit diagram of the bidirectional control device; and

FIG. 4 is a circuit diagram of the data parity bit control device.

DESCRIPTION OF THE PREFERRED EMBODIMENT

Figure 2:
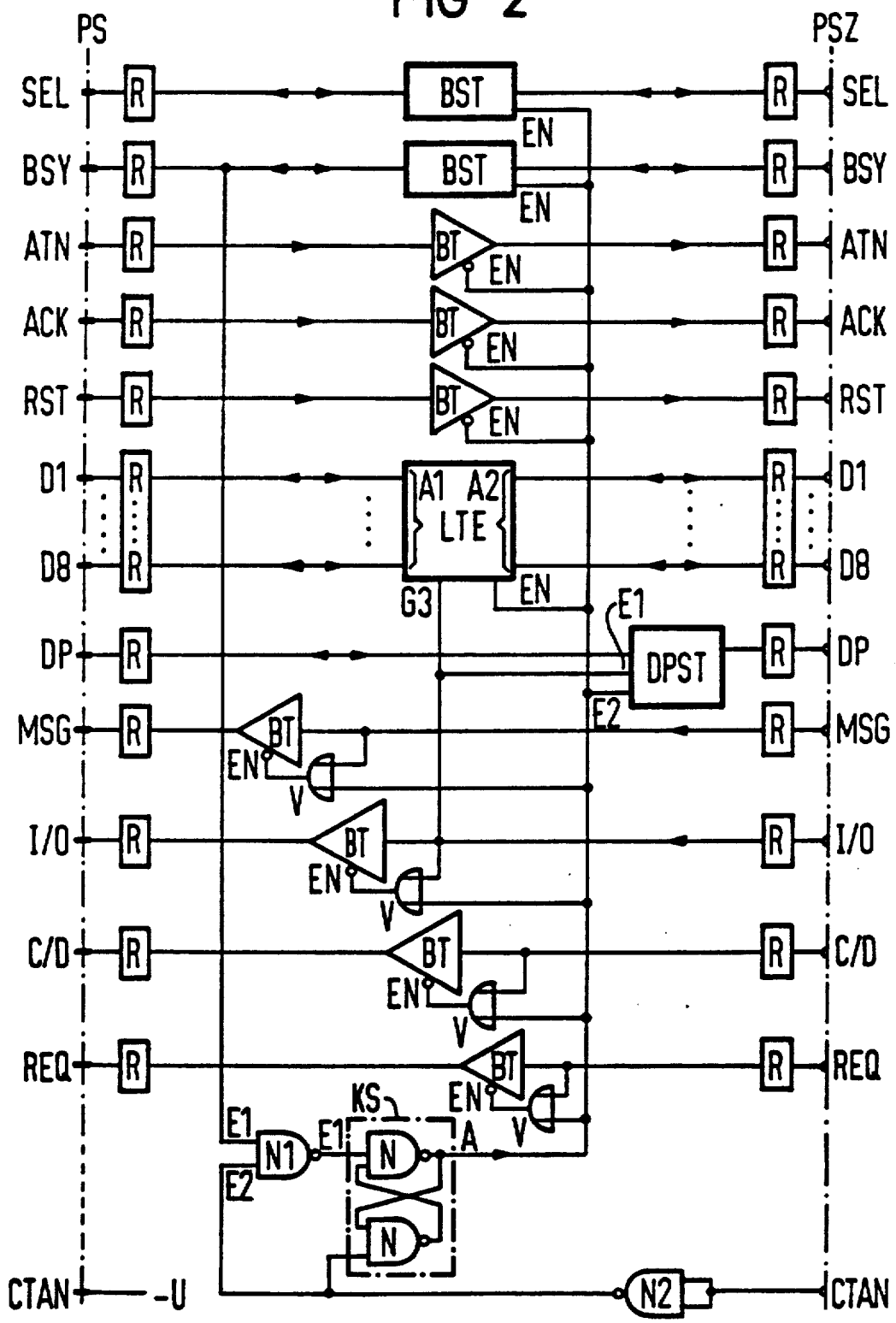
FIG. 2 is a circuit diagram of the adapter means.

In a block diagram, FIG. 1 shows the connection of computer peripherals PE to a computer system RE. The computer system RE is composed of a central processing unit CPU and of a device interface control device PS-ST. The two installations CPU, PS-ST are connected with each other via an internal bus system B. This internal bus system B is usually composed of address, data, and control lines. The central processing unit CPU is realized, for example, by a microprocessor system SAB 80,286 marketed by Siemens. In the device interface control installation PS-ST, the physical and procedural features of the internal bus system B are adapted to a device interface PS. This device interface PS is, as initially explained in detail, defined in detailed fashion in the American National Standard X3T9.2, and is provided for the connection of computer peripherals, as for example, floppy disk drive mechanisms, fixed memory equipment, and other output installations, as e.g. printers. The device interface control device PS-ST contains (not shown in detail in FIG. 1) interface means for the physical realization, and a microprocessor system for the procedural realization.

With the assistance of a program suitable in this microprocessor system, the procedures according to the ANSI-recommendation X3T9.2 are realized. For the device interface PS, connecting points 1..50 are provided, whereby an interface contact is respectively allocated to two connecting points. Given an unbalanced configuration of the device interface PS, one connecting point of a data or control interface contact is connected with ground potential. The respectively other connecting point of these interface contacts is connected, via corresponding lines, with a connecting point of an adapter means ADE as well as with a connecting point of a first computer peripheral PEI in parallel fashion. In the adapter means ADE, as well as in the first computer peripheral PEI, interface control devices are present with whose assistance the physical and procedural features of the ANSI-interface X3T9.2 are realized. The adapter means ADE has an additional device interface PSZ. This additional device interface PSZ is connected with a second peripheral device PE2, e.g. a floppy disk drive. The additional device interface PSZ corresponds to the device interface PS regarding its physical and procedural features.

FIG. 2 shows the circuit diagram of an adapter means ADE according to the invention. The device interface PS and the additional device interface PSZ are respectively specified by dash-dot lines. For the device interface PS as well as for the additional device interface PSZ, respectively, the data and the control interface contacts are shown. The potential interface contacts which are not shown are connected through according to the ANSI-recommendation X3T9.2. Each interface contact is provided with a voltage divider R. From each interface contact, a 220 ohm resistance is guided to a positive supply voltage of 5 V and a 330 ohm resistance to ground potential.

On the side of the device interface, the voltage dividers R must be connected with the interface contacts in detachable fashion, e.g. via plug-type connections. This measure is necessary since several computer peripherals PE or adapter means ADE can be connected in parallel fashion to the device interface PS, however, only in one of the installations PE, ADE are the interface contacts to be provided with a voltage divider R according to the standard X3T9.2.

Preferably, the locally remotest computer peripheral PE or adapter means ADE is equipped with the voltage dividers R, and in the case of the other adjacently residing installations PE, ADE are the voltage dividers R removed or not arranged. The "select" and the "busy" interface contact SEL, BSY of the device interface PS is connected with the "select" or "busy" interface contact SEL, BSY of the additional device interface PSZ, respectively, via a bidirectional control device BST. The bidirectional control device BST is shown in detail in FIG. 3 and explained.

The "attention", the "acknowledge" and the "reset" interface contact ATN, ACK, RST of the device interface PS is connected with a "attention", an "acknowledge" and a "reset" interface contact ATN, ACK, RST of the additional device interface PSZ respectively via a bus driver installation BT effective in the direction of the additional device interface PSZ.

The eight data interface contacts D1 . . . D8 of the device interface are directed to eight first contacts A1 of a line driver installation LTE. Eight second contacts A2 of the line driver installation LTE are connected with the data interface contacts D1 . . . D8 of the additional device interface PSZ. This line driver installation LTE is realized for example by an integrated circuit 74ALS245 (Advanced Low Power Schottky - technology) marketed by Texas Instruments. This circuit contains eight bidirectionally controllable line drivers with contacts of the three-status type. The information transmission direction is determined by the feeding of corresponding signals to a control input G3. The terminals of this line driver installation LTE are switched to high impedance or effective via an effective input EN, possibly due to the three-state type.

The "data parity bit" interface contact DP of the device interface PS is guided via a "data parity bit" control device DPST, shown in FIG. 4 and explained in more detail, to the data parity bit interface contact DP of the additional device interface PSZ. The communication, the input/output, the data/control and the "request" interface contact MSG, I/O, C/D, REQ of the additional device interface PSZ is connected, respectively, via a bus driver installation BT effective in the direction of the device interface PS with the communication, the input/output, the data/control and the "request" interface contact MSG, E/O, C/D, REQ of the device interface PS. The input/output interface contact I/O of the additional device interface PSZ is additionally connected with the control input G3 of the line driver installation LTE and a first input El of the data parity bit control device DPST. By the feeding of a corresponding signal at this input/output interface contact I/O is determined in which direction the data information and the "data parity" information are to be transmitted.

The bus driver installations BT are realized for example by integrated circuits 74 S 125 (Schottky-technology) marketed by Texas Instruments. This bus driver installation BT comprises an active/effective input EN with whose assistance respectively the output of the bus driver installation BT can be controlled effectively or in high impedance fashion. Herefor, the bus driver installations BT are equipped with three-condition outputs. The active inputs of the bus driver installations BT connected to the communication, input/output, data/control and request interface contacts MSG, I/O, C/D, REQ are respectively connected with the output of a logic element V. These logic elements are realized for example by integrated circuits 74 ALS 02 (Advanced Low Power Schottky-technology), logic OR element of Texas Instruments.

Respectively one input of these logic elements V is connected with the appertaining interface contact MSG, I/O, C/D, REQ. The respectively second inputs of these logic elements V are connected with each other and guided to the output A of an RS flip flop KS. The RS flip flop KS is composed for example of two logic elements N arranged as flip flop circuit. The logic elements N are realized for example by integrated circuits 74 LS 132 (logic NAND gate).

The output of the RS flip flop KS is additionally connected to the active inputs EN of the bus driver installations BT integrated in the rest of the interface contacts ATN, ACK, RST and to an active input EN of the line driver installation LTE, the bidirectional control installation BST and the "data parity" control device DPST. A first input El of the RS flip flop KS is guided to the output of a first NAND logic element N1. A first input El of this first NAND element N1 is connected with the "busy" interface contact BSY of the device interface PS. A second input E2 of the first NAND element N1 is connected with a second input E2 of the RS flip flop KS and with an output of a second NAND element N2. The connected inputs of the second NAND element N2 are guided to a control interface contact CTAN of the additional device interface PSZ.

If ground potential is guided to this control interface contact CTAN via a connected computer peripheral PE, all unidirectionally and bidirectionally controllable installations are switched active/effective with the assistance of the RS flip flop KS, if the device interface PS is not already occupied for information transmission by another computer peripheral PE or by the computer system RE indicated by the corresponding potential at the "busy" interface contact BSY.

The direction of flow transfered of the line driver installation LTE and the data parity control installation DPST is adjusted by the corresponding signals at the input/output interface contact I/Q.

FIG. 3 shows the circuit diagram of the bidirectional control device BST. Bidirectionally integrated in the interface contacts SA are respectively two serially arranged bus driver installations BT in parallel fashion, whereby the output of the second bus driver installations BT connected in series is respectively connected with the input of the other first of the bus driver installations BT connected in series. The output of respectively the first of the serially connected bus driver installations BT is respectively guided to the active input EN of the parallely arranged first bus driver installation BT. By that means, merely one bus driver installation BT can be switched actively. From the outputs of the first of the serially connected bus driver installations BT, respectively, one load rsistor RA is guided to the positive distribution voltage +U. The respectively second of the serially connected bus driver installations BT are switched active via an active input EN and respectively vai a logic element V. Hereby, respectively one input of the logic elements V is connected with the active input EN of the bidirectional control installation BST and the respectively other input with the input of the bus driver installation BT to be switched active. Again, the bus driver installations BT are realized for example via integrated circuits 74 S 125 of Texas Instruments and the logic elements via integrated circuits 74 ALS 02.

FIG. 4 shows the circuit diagram of the "data parity bit" control device DPST. Between the "data parity bit" interface contacts DP two bus driver installations BT are integrated bidirectionally. The active inputs EN of the bus driver installations BT as well as their their direction of flow transfered are controlled by the feeding of the corresponding signals to a first and second input El, E2 with the assistance of three NAND elements N. By the feeding of the corresponding signals to the first input El is the direction of flow transfered determined. Due to the signals of the RS flip flop KS guided to the second input E2 of the "data parity bit" control device DPST—see FIG. 2—both bus driver installations BT are switched effective/active or in high impedance fashion independantly from the currently adjusted direction of flow transfered. The bus driver installations BT are likewise realized for example via integrated circuits 74 S 125 and the NAND elements N via integrated circuits of the standard series 74 ALS 00 of Texas Instruments. For the bus and line driver installations BT, LTE integrated circuits are to be selected, as specified in the example, which can provide an output current of at least 48 mA corresponding to the standard X 3T9.2 given a logic "0".

It will be understood that variations and modifications may be effected without departing from the spirit and scope of the novel concepts of the present invention.

I claim:

1. An arrangement for the trouble-free connection of computer peripherals to a multi-pole device interface controlled by at least one computer system to which computer peripherals can be connected in parallel fashion, and which is composed of bidirectionally effective data interface contacts and bidirectionally and unidirectionally effective control interface contacts, said data and control contacts being controlled by said computer system and/or the computer peripherals, and the said data and control interface contacts being provided at the said computer system and at the said computer peripherals, respectively, with defined terminating impedances, and asymmetrical digital data and control signals to be transmitted via a device interface or via interface cables being limited to a prescribed maximum length and emitted within prescribed voltage level values or, respectively, received within prescribed voltage level values in evaluatable fashion, including, in combination;

an adapter aid (ADE) incorporated between the said computer system (RE) and the said computer peripherals (PE), said adapter aid (ADE) including a device interface (PS) connected to said computer system (RE) and including an additional device interface (PSZ) connected to a said computer peripheral (PE), said device interface (PS) and said additional device interface (PSZ) having data and control interface contacts provided with prescribed terminating resistances (R), the said bidirectionally effective data and control interface contacts (SCL), BSY, D1-D8, DP) of the device interfaces (PS, PSZ) being connected via bidirectionally controllable, selectively switchable first switching means (BST, LTE, DPST), the unidirectionally effective control interface contacts (BSY, ATN, ACK, RST, MSG, I/O, C/D, REQ) of the two device interface (PS, PSZ) being connected via unidirectionally controllable, selectively switchable second switching means (BT), and the first and second switching means (BST, LTE, DPST, BT) being adapted to be switched effectively via a control interface contact (CTAN) arranged in the said additional device interface (PSZ), with the assistance of third switching means (KS) and logic elements V, N by a computer peripheral (PE) actively connected at the additional device interface (PSZ), logic means for detecting whether information is currently being transmitted via the device interface (PS) by one of the parallely arranged computer peripherals (PE) or said computer system (RE), said third switching means being connected to said logic means and responsive thereto.

2. The arrangement according to claim 1, characterized in that said first switching means (BST, LTE, DPSC) comprise bidirectionally controllable, selectively switchable integrated circuits.

3. The arrangement according to claim 1, characterized in that the first switching means (BST, LTE, DPSC) comprise bidirectionally connected, unidirectionally effective, selectively switchable integrated driver circuits (BST, DST) and logic elements (VN).

* * * * *